(12) United States Patent
Nguyen et al.

(10) Patent No.: US 12,594,633 B1
(45) Date of Patent: Apr. 7, 2026

(54) ASSEMBLY AND METHOD FOR PREPARING A PIPE ELBOW FOR WELDING

(71) Applicants: Toan T. Nguyen, Mint Hill, NC (US); Jaret Cherkewick, Fort Saskatchewan (CA)

(72) Inventors: Toan T. Nguyen, Mint Hill, NC (US); Jaret Cherkewick, Fort Saskatchewan (CA)

( * ) Notice: Subject to any disclaimer, the term of this patent is extended or adjusted under 35 U.S.C. 154(b) by 692 days.

(21) Appl. No.: 18/064,957

(22) Filed: Dec. 13, 2022

(51) Int. Cl.
| | |
|---|---|
| *B23B 3/22* | (2006.01) |
| *B23B 5/16* | (2006.01) |
| *B23K 37/04* | (2006.01) |
| *B23Q 3/06* | (2006.01) |
| *B23K 33/00* | (2006.01) |
| *B23K 101/10* | (2006.01) |

(52) U.S. Cl.
CPC .......... B23K 37/0435 (2013.01); B23Q 3/064 (2013.01); B23B 5/16 (2013.01); B23K 33/006 (2013.01); B23K 2101/10 (2018.08)

(58) Field of Classification Search
CPC ............ B23K 37/0435; B23K 2101/10; B23K 33/006; B23K 2101/06; B23Q 3/064; B23B 2270/205; B23B 5/162; B23B 3/26; Y10T 82/22; Y10T 82/2522; Y10T 279/1054
See application file for complete search history.

(56) References Cited

U.S. PATENT DOCUMENTS

| | | | | |
|---|---|---|---|---|
| 3,875,832 A | * | 4/1975 | Mayfield ................. | B23B 5/162 144/205 |
| 3,987,523 A | * | 10/1976 | Nelson ................. | B23K 33/004 82/1.11 |
| 4,050,836 A | * | 9/1977 | Anders ................... | B23C 3/051 82/1.4 |
| 4,114,484 A | * | 9/1978 | Feamster, III .......... | B23B 5/162 408/104 |
| 4,169,396 A | * | 10/1979 | Astle ....................... | B23B 5/162 408/80 |
| 4,245,529 A | * | 1/1981 | Astle ....................... | B23B 5/162 408/80 |

(Continued)

FOREIGN PATENT DOCUMENTS

| | | |
|---|---|---|
| CN | 203330754 U | 12/2013 |
| CN | 103612161 A | 3/2014 |

(Continued)

*Primary Examiner* — Sara Addisu
(74) *Attorney, Agent, or Firm* — EGBERT, MCDANIEL & SWARTZ, PLLC

(57) ABSTRACT

An assembly and method for preparing a pipe elbow for welding. The assembly has a cone clamping sleeve assembly adapted to be inserted into an end of the pipe elbow and a faceplate assembly removably affixed to the cone clamping sleeve assembly. The cone clamping sleeve assembly has a face at one end thereof. The face has at least one locating hole and at least one screw hole. The faceplate assembly has at least one locating pin receivable by the locating hole of the cone clamping sleeve assembly. The faceplate assembly has a captive screw threadedly received by the screw hole. The faceplate assembly has at least a pair of centering pins positioned at diametrically opposed locations on a faceplate. The centering pins are radially adjustable and adapted to bear against an inner diameter of the end of the elbow.

12 Claims, 6 Drawing Sheets

(56)          References Cited

U.S. PATENT DOCUMENTS

| | | | | |
|---|---|---|---|---|
| 4,257,289 A * | 3/1981 | Groothius | ............... | B23B 5/162 |
| | | | | 144/205 |
| 4,483,522 A * | 11/1984 | Nall | ........................ | B23B 5/162 |
| | | | | 269/48.1 |
| 4,493,232 A * | 1/1985 | Nall | ........................ | B23B 5/162 |
| | | | | 82/113 |
| 4,601,222 A * | 7/1986 | Gill | ........................ | B23B 5/162 |
| | | | | 408/82 |
| 4,614,136 A * | 9/1986 | Pertle | ...................... | B23B 5/162 |
| | | | | 82/113 |
| 4,693,643 A * | 9/1987 | Heyworth | ............... | B23B 5/168 |
| | | | | 408/82 |
| 4,823,655 A * | 4/1989 | VanderPol | .............. | B23B 3/162 |
| | | | | 74/670 |
| 4,824,301 A * | 4/1989 | Martin | .................... | B23B 5/162 |
| | | | | 82/113 |
| 5,083,484 A * | 1/1992 | VanderPol | .............. | B23B 5/162 |
| | | | | 82/113 |
| 5,887,501 A * | 3/1999 | Ricci | ...................... | B23B 3/265 |
| | | | | 82/123 |
| 6,050,161 A * | 4/2000 | Tremblay | ............... | B23B 5/162 |
| | | | | 82/132 |
| 6,202,522 B1 * | 3/2001 | Tremblay | ............... | B23B 5/162 |
| | | | | 82/131 |
| 6,220,130 B1 * | 4/2001 | Beakley | .................. | B23B 5/162 |
| | | | | 82/136 |
| 6,755,101 B1 * | 6/2004 | Waring | ................... | B23B 5/162 |
| | | | | 82/113 |
| 6,994,002 B2 * | 2/2006 | Moruzzi | ............... | B23Q 3/183 |
| | | | | 82/123 |
| 11,123,800 B2 | 9/2021 | Freidhoff | | |
| 2001/0029817 A1 * | 10/2001 | Strait | ...................... | B23B 31/18 |
| | | | | 82/131 |
| 2002/0174751 A1 * | 11/2002 | Singer | .................... | B23B 5/163 |
| | | | | 82/128 |
| 2004/0187658 A1 * | 9/2004 | Moruzzi | ............... | B23Q 3/183 |
| | | | | 82/123 |
| 2007/0289422 A1 * | 12/2007 | Place | ...................... | B23B 5/162 |
| | | | | 30/92 |
| 2012/0180609 A1 * | 7/2012 | Leblanc | .................. | B23B 5/167 |
| | | | | 82/15 |
| 2015/0321259 A1 * | 11/2015 | Weinberg | ............... | B23B 5/162 |
| | | | | 82/113 |

FOREIGN PATENT DOCUMENTS

| | | | | | |
|---|---|---|---|---|---|
| CN | 103317373 A | 11/2015 | | | |
| CN | 205465311 U | 8/2016 | | | |
| CN | 205497035 U | 8/2016 | | | |
| CN | 206764046 U | 12/2017 | | | |
| CN | 106670596 A | 7/2020 | | | |
| DE | 102011104102 A1 * | 12/2012 | ............ | B23B 5/168 |
| EP | 217704 A * | 4/1987 | ............... | B23B 5/16 |
| EP | 740974 * | 11/1996 | ............... | B23B 5/16 |

* cited by examiner

ASSEMBLY AND METHOD FOR PREPARING A PIPE ELBOW FOR WELDING

CROSS-REFERENCE TO RELATED APPLICATIONS

Not applicable.

BACKGROUND OF THE INVENTION

1. Field of the Invention

The present invention relates to welding fixtures. More particularly, the present invention relates to welding fixtures for the preparation of pipe elbows for welding. More particularly, the present invention relates to the preparation of a pipe elbow for welding by forming a proper bevel at the open end of the pipe elbow.

2. Description of Related Art Including Information Disclosed Under 37 CFR 1.97 and 37 CFR 1.98

In the preparation of pipes for welding, it is necessary to create a bevel prep at the edge of the pipe so as to provide a surface for the welding electrode to settle and penetrate the gaps. The bevel is the forming of the pipe edge. This opening gives the welder access to the total thickness of the material wall and allows him or her the opportunity of a successful weld using single or multiple passes.

Importantly, it is quite difficult to form such a bevel prep at the edge of a pipe elbow. It is difficult for fixtures to properly hold such an elbow whereby a uniform bevel can be created. The curvatures in the pipe elbow will vary so that conventional fixtures will not properly support the pipe elbow during the machining processes required for creating the bevel. As such, a need has developed so as to provide a proper fixture whereby the bevel at the edge of a pipe elbow can be properly created, along with the formation of other surfaces prior to welding.

In the past, various patents and publications have issued with respect to fixtures for pipe elbows. For example, U.S. Pat. No. 11,123,800, issued on Sep. 21, 2021 to Freidhoff et al., describes a pipe edge preparation tool. This is a tool for performing work on a workpiece, such as a pipe, and includes a mandrel assembly configured to be secured to an interior portion of the pipe. The mandrel assembly includes an arm assembly configured to retain a cutting apparatus so as to be positioned at an outside portion of the pipe and allow the cutting apparatus to revolve around the circumference of the pipe to perform work on the pipe. The mandrel assembly includes a hub and a plurality of jaws that allow it to be secured to the interior of the pipe while the arm assembly props the cutting apparatus in a position to facilitate performing work on the pipe around the entire circumference of a section of the pipe.

Chinese Patent No. 103612161, published on Mar. 5, 2014, describes a clamp for a pipefitting beveling machine. This clamp comprises an upper side plate and a lower side plate. A cutting fluid arc groove is formed in the inner wall of the upper side plate. A plurality of cutting fluid spray holes communicate with the cutting fluid arc groove and are formed in the outer wall of the upper side plate in the direction of the cutting fluid arc group. A sheet is arranged on the side of the cutting fluid arc groove to close the cutting fluid arc group. A connector is connected with a cutting fluid conveying pipe arranged on the sheet. Cutting fluid can directly flow in the cutting fluid arc groove in the inner wall of the upper side plate and then to a cut portion of the pipefitting through the pipe fluid spray holes and the outer wall of the upper side plate and cools the machining of the beveled edge.

Chinese Patent No. 206764046, published on Dec. 19, 2017, teaches an elbow fixture for clamping an elbow to facilitate a screw thread process at the ends of the elbow. The elbow fixture includes a pedestal having a lower support structure and a back-supported structure. The lower support structure and the back-support structure are provided with a groove. The groove is used to support the element at the ends to be clamped. A pressing plate is movably connected with the pedestal and is used to push down the ends of the elbow. The elbow is fixed between the pressing plate and the groove.

Chinese Patent No. 205465311, published on Aug. 17, 2016, describes an elbow cutting fixture. This elbow cutting fixture has a bottom plate in a movable grip lock on a bottom plate. A gripping board interconnects a first board and a second board with the center gripping hole that fits with the outer wall of the elbow between the first board and the second board. A grip block bottom utilizes magnetism to secure the elbow.

Chinese Patent No. 203330754, published on Dec. 11, 2013, describes an elbow clamp for lathing. The elbow clamp is clamped on a lathe chuck and has a supporting seat and a clamping device for clamping an elbow. The supporting seat has a base plate and a containing seat. The containing seat is fixedly connected with the base plate. A containing supporting face enables one end portion of the elbow to be placed on the containing seat. A leaning face enables the other end portion of the elbow to lean on a base. The clamping device is arranged on the containing seat. The clamping device clamps the elbow in at least two different directions.

Chinese Patent No. 103317373, published on Nov. 18, 2015, teaches a lathe process elbow clamp suitable for installation on a lathe chuck. This lathe process elbow clamp comprises a supporting base and a clamping device for clamping the elbow. The supporting base has a base plate and a placement rack. The placement rack is fixedly connected with the base plate. The placement rack is provided with a supporting surface having a first curved end. The base is provided with a dependent face arranged adjacent to another end of the elbow. The clamping device has at least three clamps extending from two different directions. The elbow clamp clamps the elbow to be machined on the lathe.

Chinese Patent No. 205497035, published on Aug. 24, 2016, describes an elbow pipe beveling fixture. This elbow pipe beveling fixture has a bottom plate, and first and second clamping devices positioned on the bottom plate. The first clamping device has a pair of fixed settings that are supported on the bottom plate. The second clamping device has a pair of activity sets supported on the bottom plate.

Chinese Patent No. 106670596, published on Jul. 7, 2020, provides an elbow clamp fixture. This elbow clamp fixture is used for clamping an elbow to facilitate a threading process at opposite ends of the elbow. These threads are configured so that a pipeline can be connected through the elbow threads. The elbow fixture includes a base and a clamping device. The base includes a bottom supporting structure and a back supporting structure which form a preset included angle with each other. The bottom supporting structure and the back supporting structure are both provided with grooves. The grooves are respectively used for supporting opposite ends of the elbow to be clamped. A pair of pressing plates are respectively movably connected to the base and are used for urging the opposite ends of the elbow so that the elbow is fixed between the pressing plates and the groove. The base further has a mounting structure used for connecting parts for clamping workpieces in the machine tool.

It is an object of the present invention to provide a method and assembly that allows for efficient mounting of the fixture onto a pipe elbow.

It is another object of the present invention to provide a method and assembly in which a standard pipe beveller can be applied to machine bevels with great accuracy to the pipe elbow.

It is another object of the present invention to provide a method and assembly that avoids the need to hand prepare or utilize a machine shop for the preparation of the elbow.

It is another object of the present invention to provide a method and assembly that has a compact size for use in tight and confined work locations.

It is another object of the present invention to provide a method and assembly that allows the use of bevel, face and counterbore knives simultaneously so as to form precision bevels.

It is another object of the present invention provide a method and assembly that performs and prepares the bevels with high accuracy each and every time.

It is another object of the present invention to provide a method and assembly that has a quick and easy set-up time.

It is a further object of the present invention to provide a method and assembly that is compatible with inner diameter-mounted pipe bevellers existing on the market.

It is a further object of the present invention to provide a method and assembly that has four precision dial indicators so as to accurately center the fixture on the inner diameter of the pipe elbow.

It is a further object of the present invention to provide a method and assembly that withstand repeated usage.

It is a further object of the present invention to provide a method and assembly that avoids damage to the inner diameter of the pipe elbow.

It is a further object of the present invention to provide a method and assembly that is available to fit various sizes of pipe elbows.

These and other objects and advantages of the present invention will become apparent from a reading of the attached specification and appended claims.

BRIEF SUMMARY OF THE INVENTION

The present invention is an assembly for preparing an elbow for welding. This assembly includes a cone clamping sleeve assembly adapted to be inserted into an end of the elbow and a faceplate assembly removably affixed to the cone clamping sleeve assembly. The cone clamping sleeve assembly has a face at one end thereof. This face has at least one locating hole and at least one screw hole therein. The faceplate assembly has at least one locating pin receivable by the locating hole of the cone clamping sleeve assembly. The faceplate assembly has a captive screw threadedly received by the screw hole of the cone clamping sleeve assembly. The faceplate assembly has a pair of centering pins positioned on diametrically opposed locations on a faceplate of the faceplate assembly. The pair of centering pins are radially adjustable and adaptable to bear against an inner diameter of the end of the elbow.

The cone clamping sleeve assembly has a tapered outer diameter at an end opposite the face of the cone clamping sleeve assembly. This tapered outer diameter is adapt to allow the cone clamping sleeve assembly to funnel into an interior of the elbow. The cone clamping sleeve assembly also has a constant outer diameter surface at the face of the cone clamping sleeve assembly. This constant outer diameter section has a plurality of threaded holes formed therethrough. Each of the plurality of threaded holes receives a thrust screw therein. This thrust screw is radially adjustable and is adapted to engage with an inner wall of the elbow. The faceplate assembly has a central opening that opens to an interior of the cone clamping sleeve assembly. The central opening is adapted to allow a wrench to pass therethrough so as to rotate the thrust screws.

In the present invention, the locating hole comprises four locating holes arranged in spaced relation adjacent a periphery of the face of the cone clamping sleeve assembly. The locating pin comprises four locating pins aligned with the four locating holes. The four locating pins are slidably received by the four locating holes. The screw hole comprises a pair of screw holes arranged at diametrically opposed locations on the face of the cone clamping sleeve assembly. The captive screw is a pair of screws respectively threadedly and removably received by the pair of screw holes.

The pair of centering pins each has a projection extending rearwardly of the faceplate of the faceplate assembly. This projection is adapted to bear against an inner diameter of the elbow. Each of the pair of centering pins has a knob connected thereto. The knob is rotatable so as to move the centering pin radially inwardly or outwardly relative to a center of the faceplate of the faceplate assembly. The pair of centering pins comprises four centering pins. Four centering pins are slidable within respective slots formed through the thickness of the faceplate of the faceplate assembly. The four centering pins are evenly radially spaced from each other. The knob comprises four knobs respectively connected to the four centering pins. The four knobs extend outwardly of a periphery of the faceplate of the faceplate assembly. The faceplate of the faceplate assembly has a central opening with a plurality of slots radiating outwardly from the central opening.

The present invention is also a method of preparing a pipe elbow for welding. This method includes the steps of: (1) affixing a faceplate assembly to a cone clamping sleeve assembly so as to form an elbow prep fixture; (2) inserting the cone clamping sleeve assembly into an interior of the pipe elbow; (3) adjusting the pair of centering pins so as to bear against an inner surface or an outer surface of the pipe elbow; (4) rigidly affixing the cone clamping sleeve assembly within an interior of the pipe elbow; (5) removing the faceplate assembly from the cone clamping sleeve assembly; (6) inserting a pipe beveller into an interior of the cone clamping sleeve assembly; (7) beveling a surface of the pipe elbow with the pipe beveller; (8) removing the pipe beveller from the pipe elbow; and (9) removing the cone clamping sleeve assembly from the pipe elbow.

In the method of the present invention, the step of affixing comprises aligning a locating pin in the faceplate assembly with a locating hole on the cone clamping sleeve assembly. The locating pin is inserted into the locating hole so as to align the faceplate assembly with the cone clamping sleeve assembly. A captive screw is screwed into a screw hole on the cone clamping sleeve assembly so as to fix the faceplate assembly to the cone clamping sleeve assembly.

The locking pin comprises four locking pins. The locating holes comprise four locating holes. The captive screw is a pair of captive screws. The screw hole is a pair of screw holes. The four locking holes and the four locking pins are aligned with each other.

The step of adjusting the pair of centering pins includes sliding the pair of centering pins in slots formed through a faceplate of the faceplate assembly and fixing a position of the pair of centering pins at a desired position within the respective slots. The pair of centering pins has a portion extending rearwardly of the faceplate and bearing against an inner wall of the pipe elbow. Each of the slots has a graduated scale thereon. The graduated scale is related of an inner diameter of the pipe elbow. The step of fixing the position of the pair of centering pins occurs by sliding the centering pins so as to have an equally corresponding positions along the graduated scale. Each of the pair of centering pins is operatively connected to a knob positioned outwardly of a periphery of the faceplate. The step of sliding the pair of centering pins comprises rotating the knob until the centering pin is at a desired location within the slot. The pair of centering pins comprises four centering pins arranged in evenly radially spaced locations with respect to the faceplate. The knob comprises four knobs operatively connected the four centering pins.

The cone clamping sleeve assembly is affixed in the interior of the pipe elbow by rotating a thrust screw so as to bear against an inner wall of the pipe elbow. The elbow prep fixture of the present invention quickly mounts on any short or long radius pipe elbow to allow the use of a standard pipe beveller to machine bevel with great accuracy. High-quality preps typically associated with orbital welding are easily attainable within mere minutes. The need to hand prep or utilize a machine shop is not required.

This foregoing Section is intended to describe, with particularity, the preferred embodiments of the present invention. It is understood that modifications to these preferred embodiments can be made within the scope of the present claims. This Section should not to be construed, in any way, as limiting of the broad scope of the present invention. The present invention should only be limited by the following claims and their legal equivalents.

DETAILED DESCRIPTION OF THE INVENTION

Figure 1:
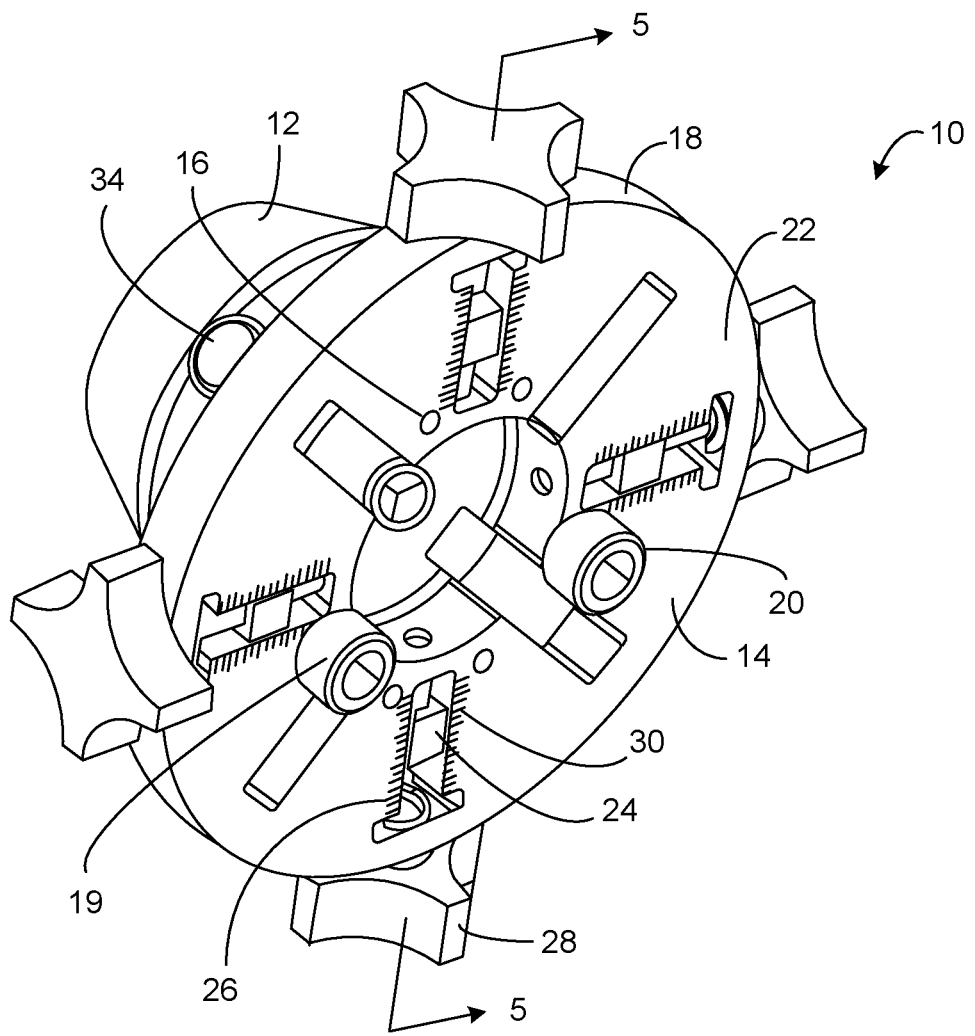
FIG. 1 is an upper perspective view of the elbow prep fixture in accordance with the teachings of the present invention.

FIG. 1 shows the elbow prep fixture assembly 10 of the present invention. The elbow prep fixture assembly 10 has a cone clamping sleeve assembly 12 and a faceplate assembly 14. The faceplate assembly 14 is removably affixed to the cone clamping sleeve assembly 12. The cone clamping sleeve assembly 12 is adapted to be inserted into an end of a pipe elbow. The faceplate assembly has a plurality of locating pins 16 form through a thickness of the faceplate 18 of the faceplate assembly 14. These locating pins are adapted be slidably received by corresponding locating holes formed on the cone clamping sleeve assembly. The faceplate assembly also has a pair of captive screws 19 and 20 that extend outwardly of the face 22 of the faceplate 18 of the faceplate assembly 14. These captive screws 19 and 20 will be threadedly received by screw hole in the cone clamping sleeve assembly 12 (as will be described hereinafter). The faceplate assembly 14 also has several centering pins 24 received within slots 26. As will be described hereinafter, each of the centering pins 24 is actuatable by knobs 28. The rotation of the knobs 28 will cause the centering pins 24 to move inwardly or outwardly relative to the center of the faceplate 22 and to ultimately engage with the inner diameter of the pipe elbow. A graduated scale 30 is formed adjacent to the slot 26 so as to allow the user to properly position each of the centering pins 24 in equally corresponding positions.

The cone clamping sleeve assembly is illustrated as having a thrust screw 34 extending outwardly therefrom. Thrust screw 34 is adapted to bear against an inner wall of the pipe elbow.

Figures 2, 3:
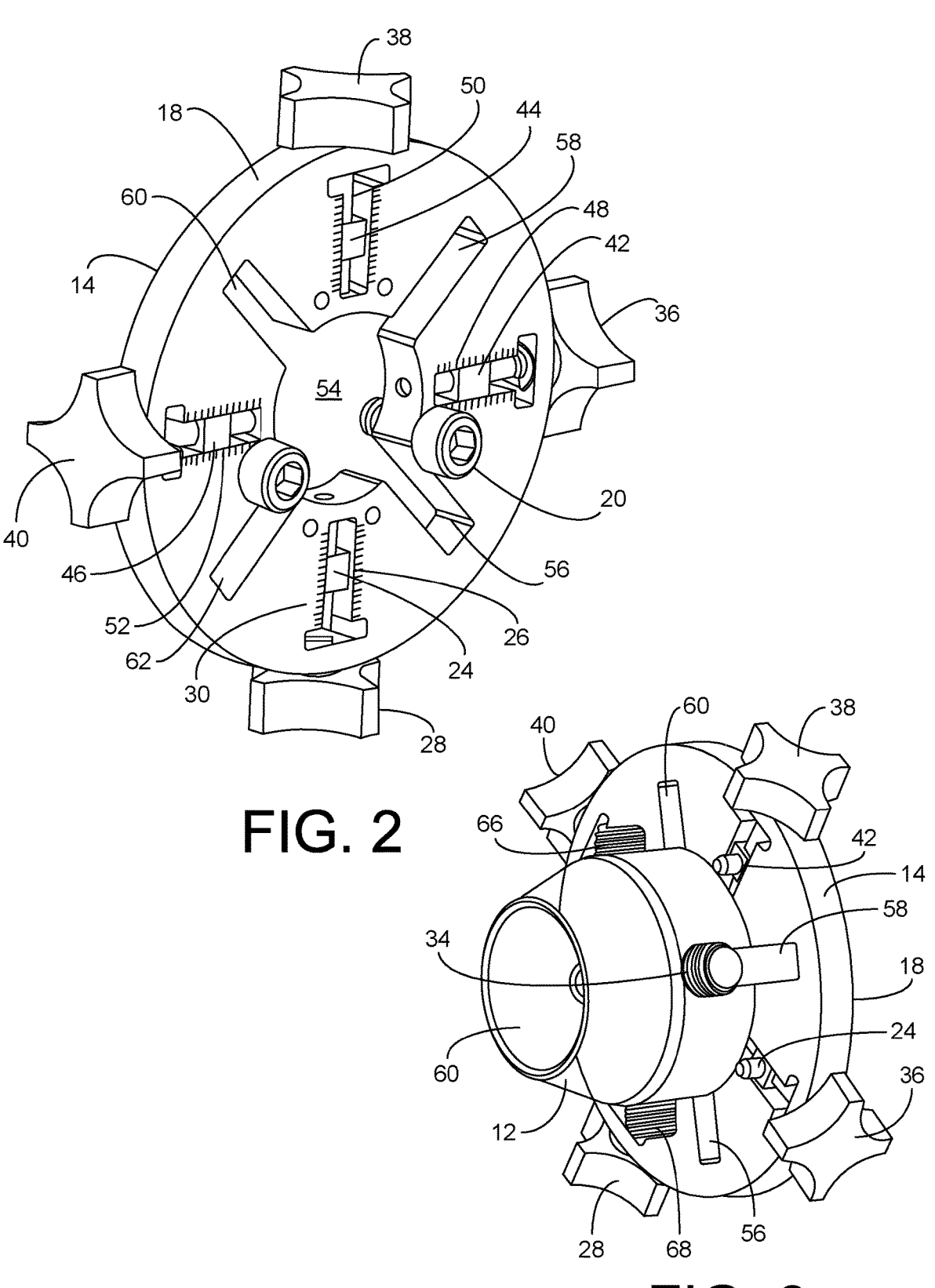
FIG. 2 is a upper perspective view showing the faceplate assembly of the elbow prep fixture of the present invention.
FIG. 3 is a rearward upper perspective view of the elbow prep fixture assembly of the present invention.

FIG. 2 shows the faceplate assembly 14 as separated from the cone clamping sleeve assembly. In particular, the faceplate assembly 14 includes knobs 28, 36, 38 and 40 arranged at evenly circumferentially spaced locations around the periphery of the faceplate 18 of faceplate assembly 14. Each of the knobs 28, 36, 38 and 40 is operatively connected to with separate centering pins 24, 42, 44 and 46. Centering pin 24 is located within slot 26. Centering pin 42 is located within slot 48. Centering pin 44 is located within slot 50. Centering pin 46 is located within slot 52. Graduated scales 30 associated with each of the slots 26, 48, 50 and 52 allow the user to rotate the respective knobs 28, 36, 38 and 40 so as to fix the position of the centering pins 24, 42, 44 and 46 evenly with respect to each other. The faceplate 18 has a central opening 54 having slots 56, 58, 60 and 62 radiating outwardly therefrom. Slots 56, 58, 60 and 62 allow the user to visualize the location of the end of the pipe elbow and the position of the thrust screw 34 by looking through these respective slots. Slots 56, 58, 60 and 62 allow a long reaching wrench to reach thrust screw 34.

FIG. 3 shows the cone clamping sleeve assembly 12 as affixed to the faceplate assembly 14. The cone clamping sleeve assembly 12 has a central passageway 60. Thrust screws 34, 66 and 68 are threadedly received within screw holes and have portions extending outwardly therefrom. One thrust screw is obscured from view in FIG. 3. In the initial installation, the inner end of each of the thrust screws 34, 66 and 68 will be flush with the inner diameter 60 of the cone clamping sleeve assembly 12. Ultimately, a wrench can be inserted into the interior of the cone clamping sleeve assembly 12 so as to rotate the thrust screws 34, 66 and 68 so as to engage with the inner wall of the pipe elbow.

The faceplate assembly 14 is illustrated as having knobs 28, 36, 38 and 40 extending outwardly of the periphery of the faceplate 18 of faceplate assembly 14. These knobs 28, 36, 38 and 40 are operatively connected to respective centering pins 24 and 42. It can be seen that the centering pins 24 and 42 have a portion extending rearwardly of the faceplate 22 of faceplate assembly 18. Ultimately, this rearwardly extending portion of the centering pins 24 and 42 can be moved so as to bear against the inner diameter of the pipe elbow. In other circumstances, and in an alternative embodiment, this rearwardly extending portions of the centering pins 24 and 42 could bear against the inner diameter of the pipe elbow. The slots 56, 58 and 60 are illustrated as aligned with the thrust screws 68, 34 and 66, respectively. As such, the slots 56, 58 and 60 allow the user to observe the movement of the thrust screws 68, 34 and 66 when engaging with the inner wall of the pipe elbow.

Figures 4, 5:
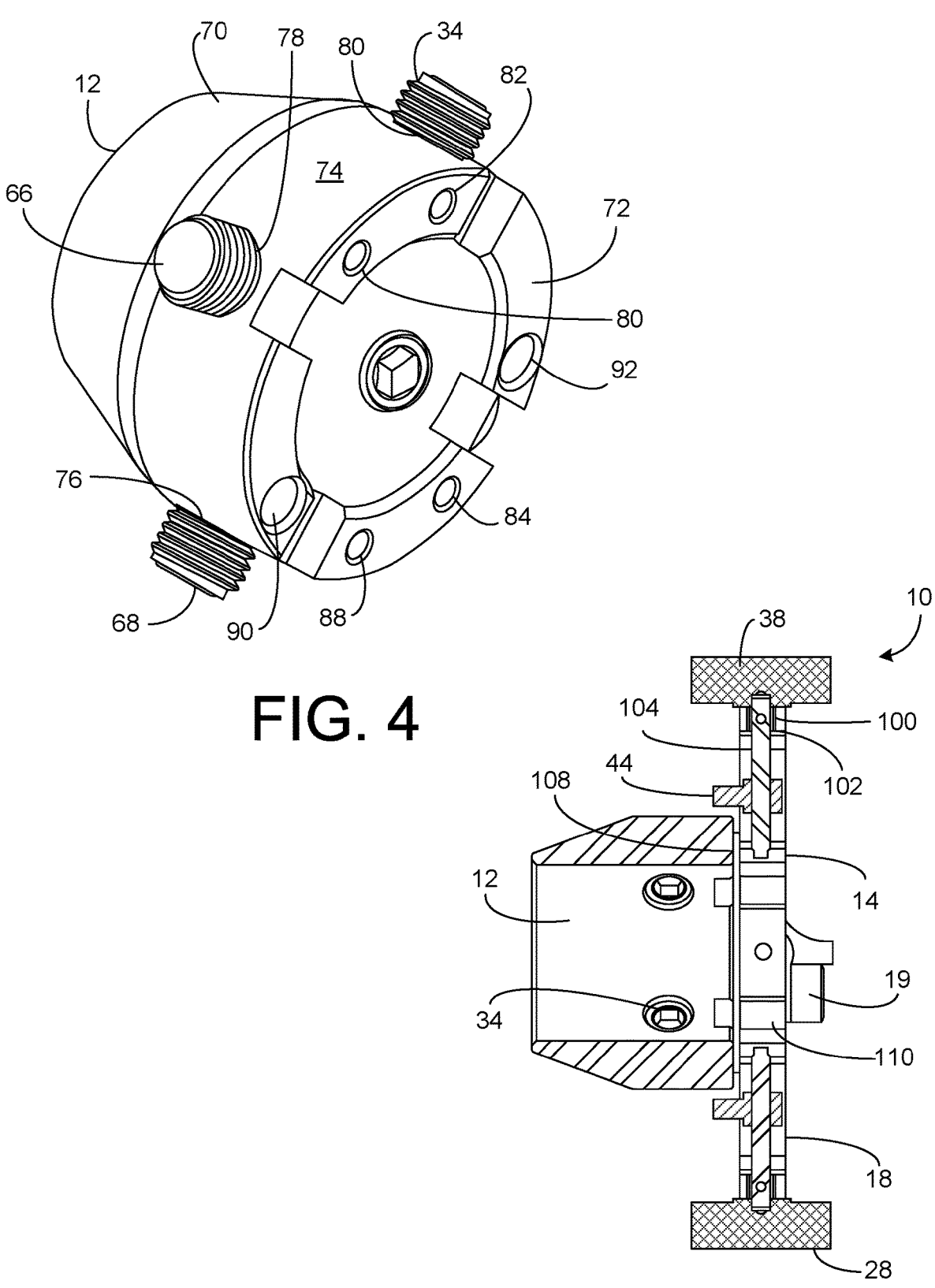
FIG. 4 is an upper perspective view of the cone clamping sleeve assembly of the present invention.
FIG. 5 is a cross-sectional view of the elbow prep fixture as taken across lines 5-5 of FIG. 1.

FIG. 4 is an isolated view of the cone clamping sleeve assembly 12. In particular, the cone clamping sleeve assembly 12 has a tapered outer diameter area 70 at an end opposite the face 72 of the cone clamping sleeve assembly 12. This tapered outer diameter area 70 is adapted to allow the cone clamping sleeve assembly 12 to funnel into an interior of the pipe elbow. A constant diameter section 74 is located adjacent to the face 72 of the cone clamping sleeve assembly 12. This constant outer diameter section 74 has a plurality of threaded holes 76, 78 and 80 that receive the respective thrust screws 68, 66 and 34 therein. The thrust screws 68, 66 and 34 are radially adjustable and adaptable to engage with an inner wall of the pipe elbow.

The cone clamping sleeve assembly 12 has four locating holes 80, 82, 84 and 88. Locating holes 80, 82, 84 and 88 are configured to slidably receive the locating pins 16 of the faceplate assembly 14. The face 72 of cone clamping sleeve assembly 12 also has screw holes 90 and 92 that are configured so as to receive the captive screws 19 and 20 of the faceplate assembly therein.

FIG. 5 shows a cross-sectional view of the elbow prep fixture 10 of the present invention. Initially, it can be seen that the faceplate assembly 14 has knobs 28 and 38 extending outwardly of the periphery of the faceplate 18 of faceplate assembly 14. The knob 38 is illustrated as supported by a sleeve bearing 100 and a retaining ring 102. Similarly, the knob 28 will also be supported by similar structures. The screw rod adjustment 104 extends through the sleeve bearing 100 and a retaining ring 102 so as to engage with centering pin 44. Screw rod adjustment 104 is supported by screw rod adjustment faceplate 108. A similar structure is associated with the knob 28. The cone clamping sleeve assembly 12 is illustrated as having the thrust screws 34 extending outwardly therefrom. Captive screw 19 is shown as engaging with the corresponding screw hole on the cone coupling sleeve assembly 12.

Figure 6:
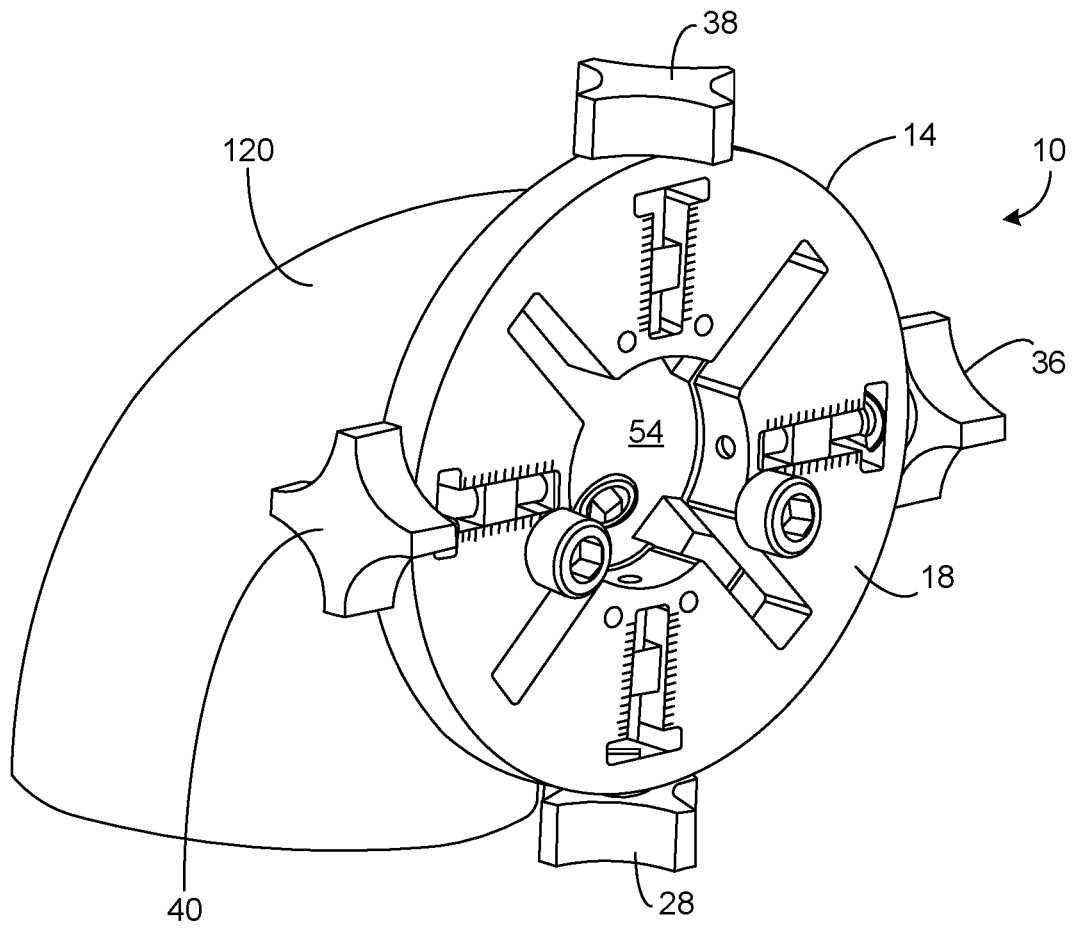
FIG. 6 is an upper perspective view showing the elbow prep fixture assembly of the present invention as installed within a pipe elbow.

In FIG. 6, it can be seen that the elbow prep fixture assembly 10 has been applied to the open end of a pipe elbow 120. As can be seen, the faceplate assembly 14 will bear against the open end of the pipe elbow 120. The faceplate 18 of faceplate assembly 14 is centrally installed within the open end of the pipe elbow 120 by rotating the knobs 28, 36, 38 and 40 until the respective centering pins are positioned at equal positions along the graduated scales within the slots on the faceplate 18 of faceplate assembly 14. This arrangement assures that the faceplate assembly 14 is centrally positioned. Similarly, the central positioning of the faceplate assembly 14 will assure that the cone clamping sleeve assembly 12 (located interior of the pipe elbow 120) will also be centrally located. When the central locating is achieved, a suitable wrench, or other tool, can be placed through the opening 54 of the faceplate assembly 14 so as to adjust the various thrust screws so as to engage with the inner wall of the pipe elbow 120.

Figure 7:
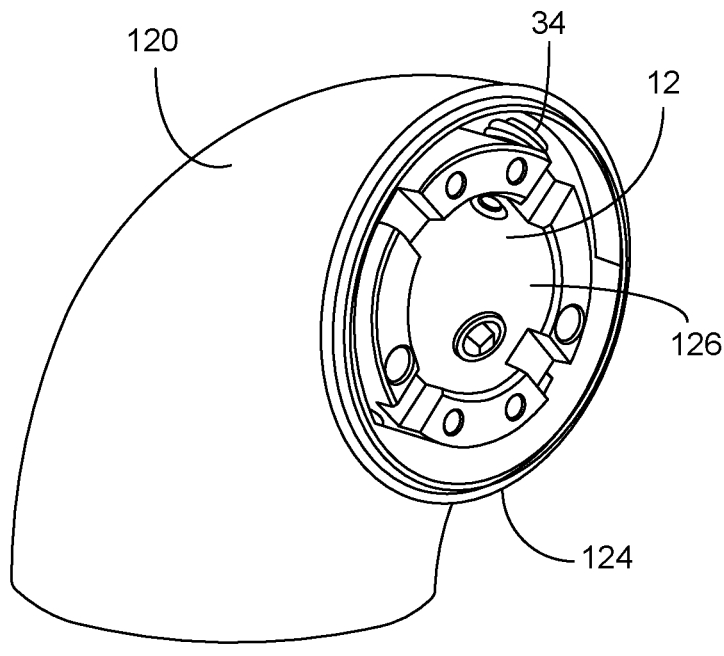
FIG. 7 is an upper perspective view showing the faceplate assembly as separate from the cone clamping sleeve assembly at the open end of the pipe elbow.

FIG. 7 shows that the cone clamping sleeve assembly 12 is installed within the open end 124 of pipe elbow 120. In particular, it can be seen that the thrust screws 34 (and others) engage with the inner wall of the pipe elbow 12 so as to support the cone clamping sleeve assembly 12 in its proper position. The cone clamping sleeve assembly 12 has an inner passageway 126 so as to allow for the introduction of a beveling tool therein.

Figure 8:
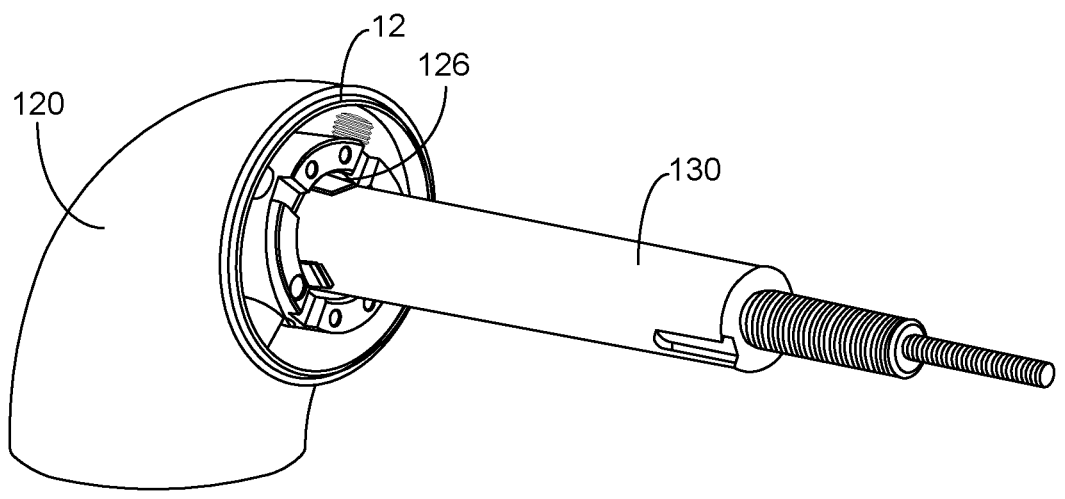
FIG. 8 is an upper perspective view showing a mandrel inserted into the interior of the cone clamping sleeve assembly of the present invention.

FIG. 8 shows the introduction of the inner diameter mandrel 130 into the inner passageway 126 of the cone clamping sleeve assembly 12 and into the interior of the pipe elbow 120.

Figure 9:
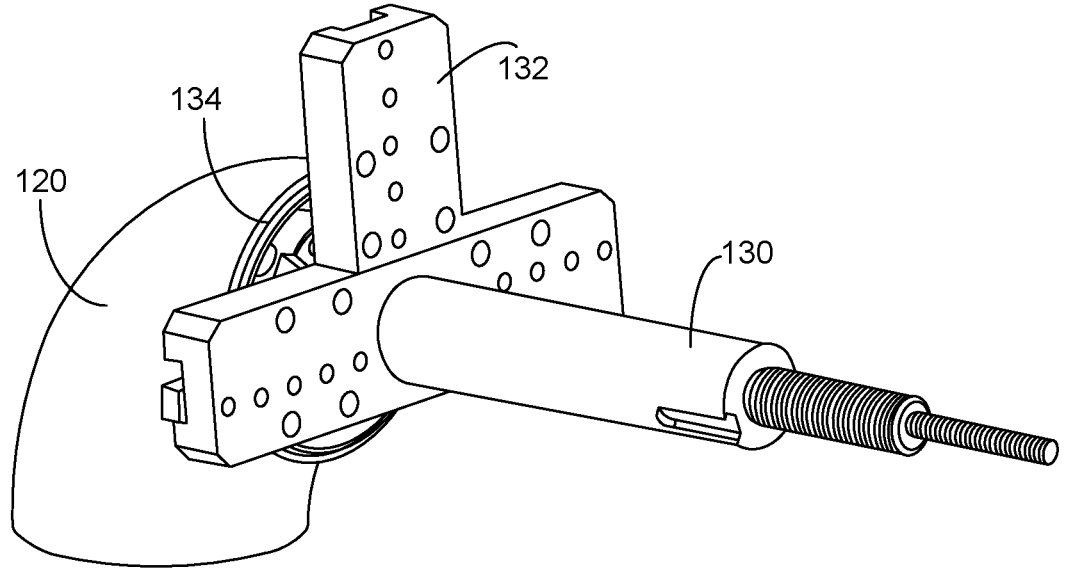
FIG. 9 is an upper perspective view showing the further step in the present invention in which a cutting blades table is applied over the mandrel for the purpose of forming the bevel at the open end of the pipe elbow.

FIG. 9 shows the cutting blade table 132 as applied over the inner diameter mandrel 130 so as to carry out the proper beveling at the end 134 of pipe elbow 120.

In general, the process for forming the proper bevel or other structure at the end 134 of pipe elbow 120 is described hereinafter. Initially, the correct elbow prep fixture assembly 10 must be chosen to match the specific size of the pipe elbow. The correct length of the thrust screws are chosen. They should be inserted flush to the inner diameter of the cone clamping sleeve assembly 12. Since four screws are involved, two shorter screws should be located in the upper half of the cone clamping sleeve assembly and two longer screws should be in the lower half of the cone clamping sleeve assembly 12.

The faceplate assembly 14 is assembled onto the cone clamping sleeve assembly 12 by inserting the locating pins into the four locating holes on the cone clamping sleeve assembly 12. Once the two assemblies are located and fit together, the pair of captive screws 19 and 20 are tightened down to securely attach the cone clamping sleeve assembly 12 to the faceplate assembly 14. The inner radius of the pipe elbow should be measured with a tape measure or caliper. The knobs are suitably rotated so as to preset the centering pins slightly less than the radius measured by using the graduated scale on the faceplate assembly 14 as reference. The elbow prep fixture 10 is inserted and oriented into the inner diameter of the pipe elbow according to the "top" and "bottom" indications on the faceplate 18 of the faceplate assembly. This will ensure the correct orientation of the elbow prep fixture assembly 10 in relation to the pipe elbow 120.

The four adjustment knobs are rotated so that the centering pins come into contact with the inner diameter of the pipe elbow evenly. The centering can be double checked by making sure that all of the scribe marks on the four centering pins are aligned upon the same scale markings on the faceplate 18 of the faceplate assembly 14. The thrust screws are then tightened down with a suitable tooth ratchet wrench by being inserted through the center hole opening of the faceplate assembly 14. These thrust screws are slowly tightened in a staggered pattern using increasing torque on each successive pass.

The faceplate assembly 14 is then removed from the cone clamping sleeve assembly 12 by unscrewing the pair of captive screws 19 and 20. A standard pipe beveller with an appropriate sized mandrel are positioned within the cone clamping sleeve assembly 12 and then the beveling action can occur. Once the desired bevel preparation is complete, the pipe beveller is removed. The thrust screws are then loosened. Once loosened, the cone clamping sleeve assembly 12 can be removed from the inner diameter of the pipe elbow.

The elbow prep fixture assembly 10 of the present invention is of a relatively compact size for use in tight and confined work locations. This fixture allows the use of bevel, face and counter bore knives simultaneously so as to achieve precise bevels. The end preparation can be carried out with high accuracy each and every time. The elbow prep fixture assembly of the present invention has a quick and easy set-up time. The elbow prep fixture assembly of the present invention is compatible with most inner diameter-mounted pipe bevellers that are currently on the market. The four precision dial indicators on the faceplate assembly 14 allow the centering of the elbow prep fixture assembly 10 on the inner diameter of the pipe elbow 120. The durable heat-treated clamping assembly is able to withstand repeated usage without damage. The cone clamping sleeve assembly can be positioned within the interior of the pipe elbow and secured thereto without damaging the interior diameter of the pipe elbow.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. An assembly for preparing a pipe elbow for welding, the assembly comprising:

a cone clamping sleeve assembly adapted to be inserted into an end of the pipe elbow, said cone clamping sleeve assembly having a face at one end thereof, the face having at least one locating hole and at least one screw hole thereon; and a faceplate assembly removably affixed to said cone clamping sleeve assembly, said faceplate assembly having at least one locating pin receivable by at least one locating hole of said cone clamping sleeve assembly, said faceplate assembly having a captive screw threadedly receivable by the at least one screw hole of said cone clamping sleeve assembly, said faceplate assembly having at least a pair of centering pins positioned on diametrically opposed locations on a faceplate of said faceplate assembly, the at least two centering pins being radially adjustable and adapted to bear against an inner diameter of the end of the pipe elbow.

2. The assembly of claim 1, said cone clamping sleeve assembly having a tapered outer diameter at an end opposite the face of said cone clamping sleeve assembly, the tapered outer diameter adapted to allow said cone clamping sleeve assembly to funnel into an interior of the pipe elbow.

3. The assembly of claim 2, said cone clamping sleeve assembly having a constant outer diameter surface at the face of said cone clamping sleeve assembly, the constant outer diameter section having a plurality of threaded holes formed therein, each of the plurality of threaded holes receiving a thrust screw therein, the thrust screw being radially adjustable and adapted to engage with an inner wall of the pipe elbow.

4. The assembly of claim 3, said faceplate assembly having a central opening that opens to an interior of said cone clamping sleeve assembly, the central opening adapted to allow a wrench to pass therethrough so as to rotate the thrust screws.

5. The assembly of claim 1, the at least one locating hole being four locating holes arranged in spaced relation adjacent a periphery of the face of said cone clamping sleeve assembly, the at least one locating pin being four locating pins aligned with the four locating holes, the four locating pins being slidably received by the four locating holes.

6. The assembly of claim 1, the at least one screw hole being a pair of screw holes arranged at diametrically opposed locations on the face of said cone clamping sleeve assembly, the captive screw being a pair of captive screws respectively threadedly and removably received by the pair screw holes.

7. The assembly of claim 1, wherein the at least a pair of centering pins each has a projection extending rearwardly of the faceplate of said faceplate assembly, the projections adapted to bear against an inner diameter of the pipe elbow.

8. The assembly of claim 7, wherein each of the at least a pair of centering pins has a knob operatively connected thereto, the knob being rotatable so as to move the centering pin radially inwardly or outwardly.

9. The assembly of claim 8, wherein the at least a pair of centering pins is four centering pins, the four centering pins been slidable within slots formed through a thickness of the faceplate of said faceplate assembly.

10. The assembly of claim 9, the four centering pins being evenly radially spaced from each other.

11. The assembly of claim 10, the knob comprising four knobs respectively operatively connected to the four centering pins, the four knobs extending outwardly of a periphery of the faceplate of said faceplate assembly.

12. The assembly of claim 9, the faceplate of said faceplate assembly having a central opening with a plurality of slots radiating outwardly from the central opening.

* * * * *